United States Patent
Cypher et al.

(10) Patent No.: US 7,376,793 B2
(45) Date of Patent: May 20, 2008

(54) CACHE COHERENCE PROTOCOL WITH SPECULATIVE WRITESTREAM

(75) Inventors: Robert E. Cypher, Saratoga, CA (US); Anders Landin, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 279 days.

(21) Appl. No.: 11/186,034

(22) Filed: Jul. 21, 2005

(65) Prior Publication Data

US 2007/0022253 A1    Jan. 25, 2007

(51) Int. Cl.
*G06F 13/00* (2006.01)
(52) U.S. Cl. .................. 711/140; 711/141; 711/163; 711/169; 711/154; 710/105; 710/58; 710/59
(58) Field of Classification Search ............ 711/141, 711/140
See application file for complete search history.

(56) References Cited

U.S. PATENT DOCUMENTS

| | | | | |
|---|---|---|---|---|
| 5,222,219 A | * | 6/1993 | Stumpf et al. ............... | 710/105 |
| 5,749,095 A | * | 5/1998 | Hagersten .................... | 711/141 |
| 6,567,414 B2 | * | 5/2003 | Deng et al. .................. | 370/402 |
| 6,654,860 B1 | * | 11/2003 | Strongin et al. ............. | 711/154 |
| 2004/0030842 A1 | * | 2/2004 | Cypher ......................... | 711/145 |

FOREIGN PATENT DOCUMENTS

WO    WO 03/001369    1/2003

OTHER PUBLICATIONS

International Search Report in Application No. PCT/US2006/028245 Mailed Apr. 12, 2006.

* cited by examiner

*Primary Examiner*—Donald Sparks
*Assistant Examiner*—Kalpit Parikh
(74) *Attorney, Agent, or Firm*—Meyertons Hood Kivlin Kowert & Goetzel, P.C.; Rory D. Rankin (57) ABSTRACT

A system and method for performing speculative writestream transactions in a computing system. A computing system including a plurality of subsystems has a requesting subsystem configured to initiate a writestream ordered (WSO) transaction to perform a write operation to an entire coherency unit by conveying a WSO request to a home subsystem of the coherency unit. The requester is configured to perform the write operation without first receiving a copy of the coherency unit and complete WSO transactions initiated in the order in which they are initiated. The home subsystem is configured to process multiple WSO transactions directed to a given coherency unit in the order in which they are received. When the requester initiates a WSO transaction to a given coherency unit, the coherency unit is locked. Responsive to receiving the WSO request, the home subsystem conveys a pull request for the write data to the requester. If the requester detects a timeout condition, the requester may cancel the WSO transaction and unlock the coherency unit in the requesting node. The requester may further convey an acknowledgment to the home subsystem indicating no data will be returned. The home subsystem may then treat the WSO transaction as being complete.

17 Claims, 11 Drawing Sheets

| Initiated Transaction Type | Initiator Receives | Initiator Sends |
|---|---|---|
| RTS | DATA | |
| RTO | DATA | |
| RS | DATA | |
| WS | PULL | DATA |
| WSO | PULL | DATA or ACKN |

FIG. 2

| ADDRESS 602 | CLIENT 1 604 | CLIENT 2 606 | CLIENT 3 608 | CLIENT 4 610 | CLIENT 5 612 |
|---|---|---|---|---|---|
| Aa | — | — | M | — | — |
| Ab | — | — | M | — | — |
| Ac | — | — | M | — | — |
| Ad | M | — | — | — | — |
| Ae | S | — | S | S | — |
| Af | — | — | M | — | — |
| Ag | — | — | — | M | — |
| ... | ... | ... | ... | ... | ... |

| Packet Type | Full Name | Description |
|---|---|---|
| RTS | ReadToShare | Requests read-only copy of coherency unit |
| RTO | ReadToOwn | Requests writable copy of coherency unit |
| RS | ReadStream | Request read-once copy of coherency unit |
| WS | WriteStream | Request to write entire coherency unit and send to memory |
| WSO | WriteStream Ordered | Request to write entire coherency unit and send to memory. May be terminated without modifying the coherency unit. |
| CPI | Copyback Invalidate | Retrieve data from remote processor and invalidate in remote processor. |
| INV | Invalidate | Invalidate coherency unit in remote processor. |
| PULL | Pull for Write | Pull Data for Write Operation. |
| ACK | Acknowledge | Acknowledgement |
| ACKN | Acknowledge - No Data | Acknowledge Request, No data provided. |
| DATA | Data | Packet which conveys data. |

FIG. 4

| Initiated Transaction Type | Initiator Receives | Initiator Sends |
|---|---|---|
| RTS | DATA | |
| RTO | DATA | |
| RS | DATA | |
| WS | PULL | DATA |
| WSO | PULL | DATA or ACKN |

CACHE COHERENCE PROTOCOL WITH SPECULATIVE WRITESTREAM

BACKGROUND OF THE INVENTION

1. Field of the Invention

This invention relates to the field of multiprocessor computer systems and, more particularly, to coherency protocols employed within multiprocessor computer systems having shared memory architectures.

2. Description of the Related Art

Multiprocessing computer systems include two or more processors that may be employed to perform computing tasks. A particular computing task may be performed upon one processor while other processors perform unrelated computing tasks. Alternatively, components of a particular computing task may be distributed among multiple processors to decrease the time required to perform the computing task as a whole.

One popular architecture in multiprocessing computer systems is a shared memory architecture in which multiple processors share a common memory. In shared memory multiprocessing systems, a cache hierarchy is typically implemented between the processors and the shared memory. In order to maintain the shared memory model in which a particular address stores exactly one data value at any given time, shared memory multiprocessing systems employ cache coherency protocols. Generally speaking, an operation is coherent if the effects of the operation upon data stored at a particular memory address are reflected in each copy of the data within the cache hierarchy. For example, when data stored at a particular memory address is updated, the update may be supplied to the caches that are storing copies of the previous data. Alternatively, the copies of the previous data may be invalidated in the caches such that a subsequent access to the particular memory address causes the updated copy to be transferred from main memory or from a cache.

Shared memory multiprocessing systems may generally employ a broadcast snooping cache coherency protocol or directory based cache coherency protocol. In a system employing a snooping broadcast protocol (referred to herein as a "broadcast" protocol), coherence requests are broadcast to all processors (or cache subsystems) and memory through a totally ordered address network. Each processor "snoops" the requests from other processors and responds accordingly by updating its cache tags and/or providing the data to another processor. For example, when a subsystem having a shared copy observes a coherence request for exclusive access to the coherency unit, its copy is typically invalidated. Likewise, when a subsystem that currently owns a coherency unit observes a coherence request for that coherency unit, the owning subsystem typically responds by providing the data to the requestor and invalidating its copy, if necessary. By delivering coherence requests in a total order, correct coherence protocol behavior is maintained since all processors and memories observe requests in the same order.

In contrast, systems employing directory-based protocols maintain a directory containing information indicating the existence of cached copies of data. Rather than unconditionally broadcasting coherence requests, a coherence request is typically conveyed through a point-to-point network to the directory and, depending upon the information contained in the directory, subsequent coherence requests are sent to those subsystems that may contain cached copies of the data in order to cause specific coherency actions. For example, the directory may contain information indicating that various subsystems contain shared copies of the data. In response to a coherence request for exclusive access to a coherency unit, invalidation requests may be conveyed to the sharing subsystems. The directory may also contain information indicating subsystems that currently own particular coherency units. Accordingly, subsequent coherence requests may additionally include coherence requests that cause an owning subsystem to convey data to a requesting subsystem. In some directory based coherency protocols, specifically sequenced invalidation and/or acknowledgment messages may be required. Numerous variations of directory based cache coherency protocols are well known.

One type of shared memory system which utilizes directories is a distributed shared memory architecture. A distributed shared memory architecture includes multiple nodes within which processors and memory reside. Each of the multiple nodes is coupled to a network through which they communicate. When considered as a whole, the memory included within the multiple nodes forms the shared memory for the computer system. Typically, directories are used to identify which nodes have cached copies of data corresponding to a particular address and coherency activities may be generated via examination of the directories. Unfortunately, processor access to memory stored in a remote node (i.e. a node other than the node containing the processor) is generally significantly slower than access to memory within the node. In particular, write operations may suffer from severe performance degradation in a distributed shared memory system. If a write operation is performed by a processor in a particular node and the particular node does not have write permission to the coherency unit affected by the write operation, then the write operation is typically stalled until write permission is acquired from the remainder of the system.

In view of the above, some protocols include a transaction that allows a processor to write an entire coherency unit to memory without receiving the previous contents of the coherency unit or retaining a copy of the coherency unit in its cache (e.g., a "writestream" transaction). However, because the previous contents of the cache line are not needed, the previous contents of the cache line are discarded. Consequently, when a processor initiates such a write transaction, the processor must commit to carrying through with the transaction and writing the entire coherency unit. However, many processing systems are configured to perform speculative transactions, and some systems may be configured to pipeline requests with no guarantee that transactions will be handled in the order in which they are requested. Because processors must commit to performing these types of transactions once initiated, the possibility of deadlock situations may arise where multiple processors are contending for the same resources.

Accordingly, an effective method and mechanism for supporting speculative writestream transactions in a shared memory computing system is desired.

SUMMARY

Systems and methods for performing speculative writestream transactions in a computing system are contemplated.

A computing system is contemplated which includes a plurality of processing units ("processors") and memory subsystems ("memory"). Among the processors is a requesting processor which is configured to initiate a writestream ordered (WSO) transaction to a coherency unit by conveying a WSO request to a home memory of the coherency unit. The WSO transaction is configured to perform a write operation to the entire coherency unit without first receiving a copy of the coherency unit. In one embodiment, the requesting processor is configured to complete WSO transactions in the order in which they are initiated. The home memory is configured to process multiple WSO transactions directed to a given coherency unit in the order in which they are received. In one embodiment, when the requesting processor initiates a WSO transaction to a given coherency unit, the coherency unit is locked in the requesting processor until the WSO transaction is either completed or cancelled.

In one embodiment, the requesting processor may cancel a WSO transaction if a condition, such as a timeout, is detected. A timeout may occur, for example, if the requesting processor has received a pull request for the WSO transaction, but is waiting for completion of a prior, blocking, transaction. Upon cancellation of a WSO transaction, the requesting processor may unlock the coherency unit, thereby making it available for further processing. In addition, the requesting processor may return an acknowledgment to the home memory which acknowledges receipt of the pull request, but indicates no data will be returned in response. Upon receipt of the acknowledgment without data, the home memory may consider the WSO transaction complete.

These and other embodiments will become apparent upon reference to the following description and accompanying figures.

BRIEF DESCRIPTION OF THE DRAWINGS

A better understanding of the present invention can be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Computer System Overview

Figure 1:
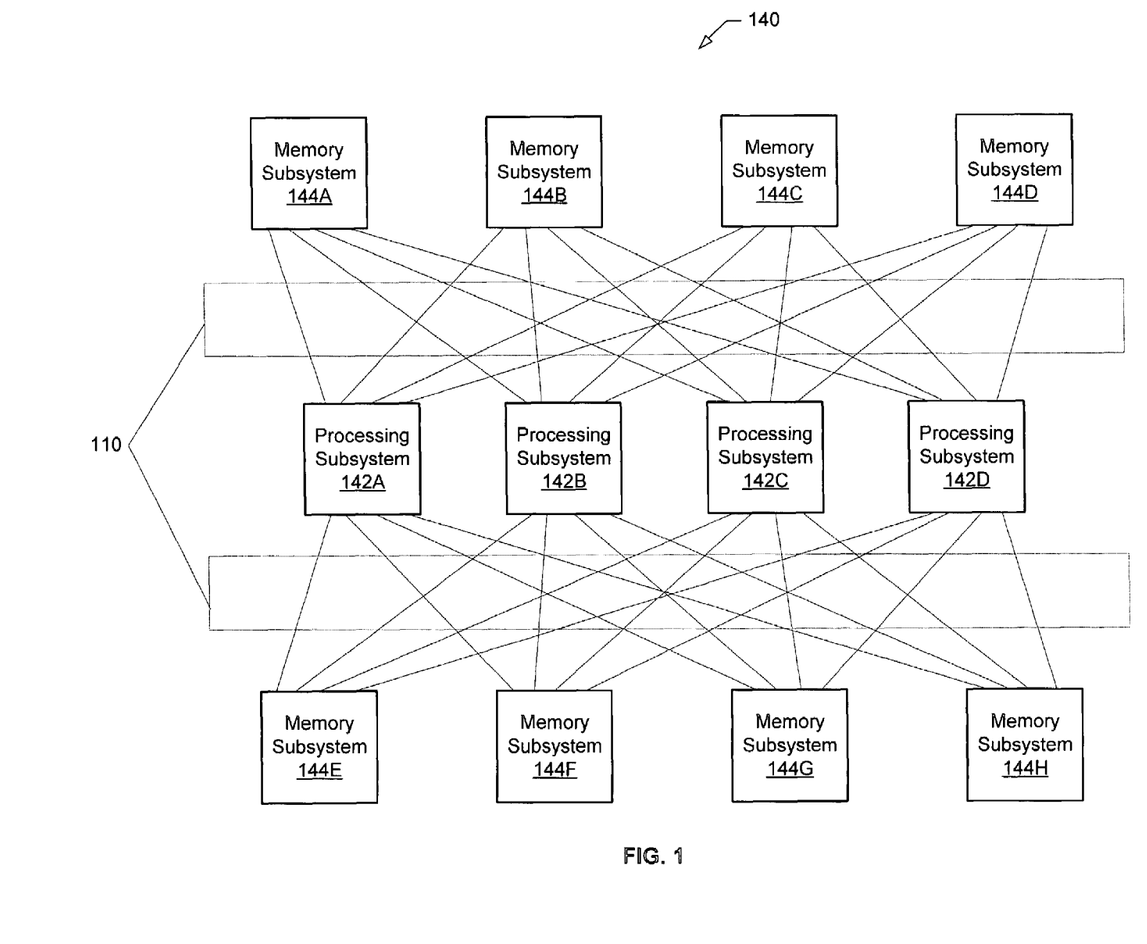
FIG. 1 is a block diagram of one embodiment of a multiprocessing computer system.

FIG. 1 shows a block diagram of one embodiment of a computer system 140. Computer system 140 includes processing subsystems 142A-142D and memory subsystems 144A-144H. In the embodiment of FIG. 1, each of processing subsystems 142 and memory subsystems 144 may be referred to as a client device. It is noted that although twelve client devices are shown in FIG. 1, embodiments of computer system 140 employing any number of client devices are contemplated. Elements referred to herein with a particular reference number followed by a letter will be collectively referred to by the reference number alone. For example, processing subsystems 142A-142B will be collectively referred to as processing subsystems 142.

Generally speaking, each of processing subsystems 142 is coupled via point-to-point interconnect 110 (generally referred to herein as "interconnect" 110, "links" 110, or "interconnect links" 110) to each of memory subsystems 144. For example, processing subsystem 142A includes a point-to-point connection to each of memory subsystems 144. In one embodiment, memory subsystems 144 are not coupled directly to one another. Point-to-point interconnects 110 between the processing subsystems 142 and memory devices 144 may comprise any suitable mechanism. For example, interconnect 110 may comprise a crossbar type mechanism, or otherwise. All such alternatives are contemplated. In one embodiment, each point-to-point link is configured to convey both address and data information. Accordingly, in such an embodiment, interconnect 110 may comprise a merged address/data network. Embodiments with split address and data networks are also possible.

Devices 142 may generally comprise any device configured to perform accesses to memory subsystems 144 may be referred to herein as "active" devices. Each client in FIG. 1 may be configured to convey address and data messages via interconnect 110. In one embodiment, each of processing subsystems 142 may comprise one or more microprocessors and/or I/O subsystems. I/O subsystems may include devices such as an input-output bridge, a graphics device, a networking device, etc.

Processing subsystems 142 may further include one or more instruction and data caches which may be configured in any of a variety of specific cache arrangements. For example, set-associative or direct-mapped configurations may be employed by the caches within processing subsystems 142. Because each of processing subsystems 142 within computer system 140 may access data in memory subsystems 144, potentially caching the data, coherency must be maintained between processing subsystems 142 and memory subsystems 144, as will be discussed further below.

Memory subsystems 144 are configured to store data and instruction code for use by processing subsystems 142. Memory subsystems 144 may include dynamic random access memory (DRAM), although other types of memory may be used in some embodiments. Each address in the address space of computer system 140 may be assigned to a particular memory subsystem 144, referred to herein as the home subsystem of the address. Additionally, each memory subsystem 144 may include a directory suitable for implementing a directory-based coherency protocol. In one embodiment, each directory may be configured to track the states of memory locations assigned to that memory subsystem within computer system 140. Additional details regarding suitable directory implementations are discussed further below.

As noted above, in one embodiment, interconnect 110 may comprise a logical point-to-point address/data network. Interconnect 110 may be implemented as an electrical bus, a circuit-switched network, or a packet-switched network. In embodiments where interconnect 110 is a packet-switched network, packets may be sent through the network using techniques such as wormhole, store and forward, or virtual cut-through. In a circuit-switched network, a particular client device may communicate directly with a second client device via a dedicated point-to-point link that may be established through a switched interconnect mechanism. To communicate with a third client device, the particular client device utilizes a different link as established by the switched interconnect than the one used to communicate with the second client device.

In one embodiment, interconnect 110 accommodates communication between processing subsystems 142 and memory subsystems 144. Messages conveyed via links 110 may generally include address and/or data packets. When an address packet references a storage location within a memory subsystem 144, the referenced location may be specified via an address conveyed within the address packet. Subsequently, data corresponding to the address packet may be conveyed via link(s) 110. Typical address packets correspond to requests for an access right (e.g., a readable or writable copy of a cacheable coherency unit) or requests to perform a read or write to a non-cacheable memory location. Address packets may be sent by a device in order to initiate a coherence transaction. Subsequent address packets may be sent to implement the access right and/or ownership changes needed to satisfy the coherence request. In the computer system 140 shown in FIG. 1, a coherence transaction may include one or more packets via links 110. Typical coherence transactions involve one or more address and/or data packets that implement data transfers, ownership transfers, and/or changes in access privileges.

As is described in more detail below, in one embodiment interconnect 110 is configured to transmit coherence requests corresponding to read or write memory operations using a point-to-point transmission mode. For coherence requests that are conveyed point-to-point, a directory-based coherency protocol is implemented.

Figure 2:
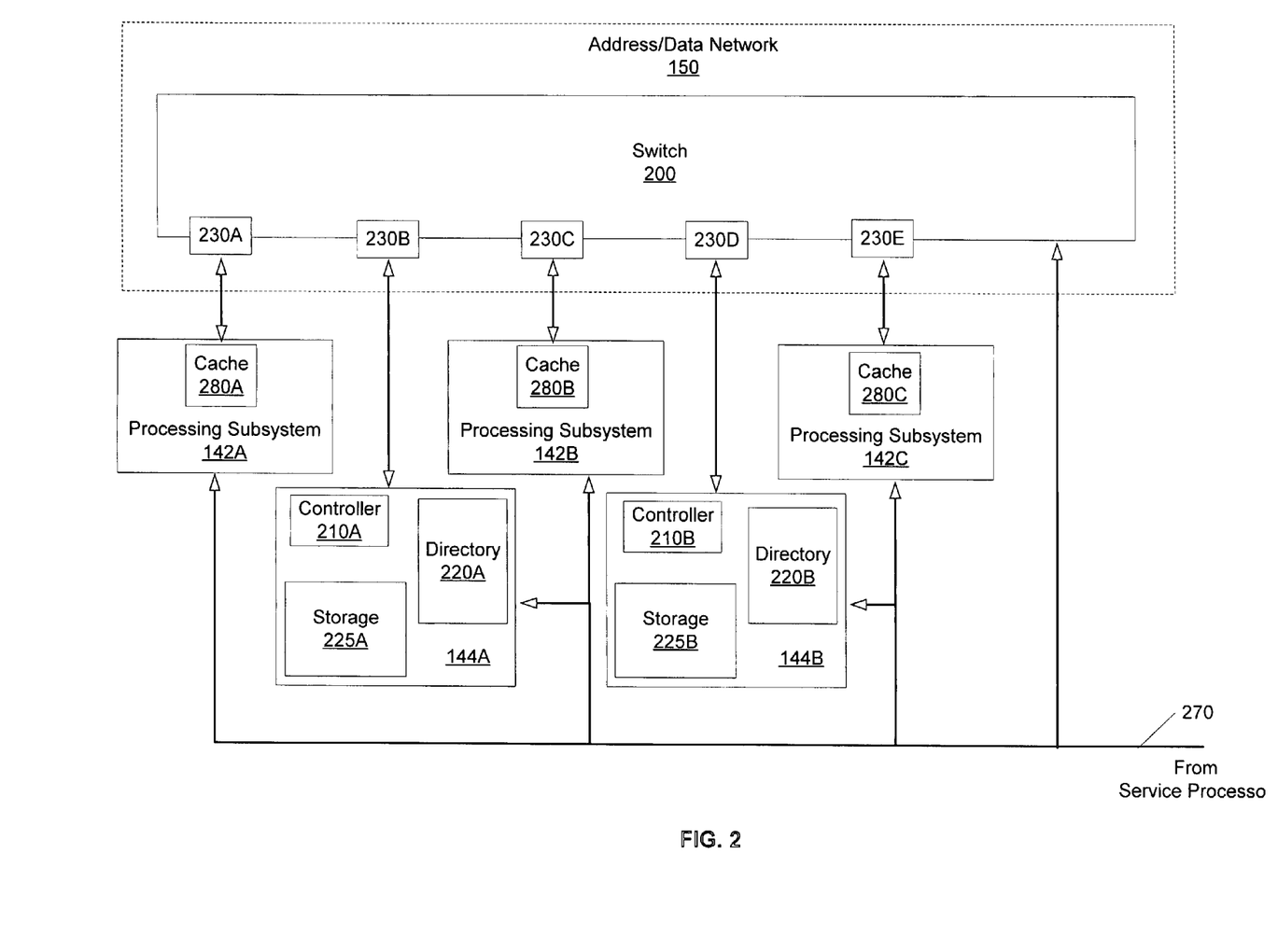
FIG. 2 is a diagram illustrating a portion of one embodiment of a computer system.

FIG. 2 is a diagram illustrating a portion of one embodiment of computer system 140. FIG. 2 shows an address/data network 150, memory subsystems 144A-144B, and processing subsystems 142A-142C. Address/data network 150 generally corresponds to one embodiment of the interconnect 110 depicted in FIG. 1. In the embodiment shown, address/data network 150 includes a switch 200 including ports 230A-230E. Processing units 142A-142C each include a respective cache 280A-280C configured to store memory data. Memory subsystems 144A and 144B are coupled to switch 200 via ports 230B and 230D, respectively, and include controller circuitry 210A-210B, directory 220A-220B, and storage 225A-225B. In the embodiment shown, ports 230 may include bi-directional links or multiple uni-directional links. Storage 225 may include RAM or any other suitable storage device.

Also illustrated in FIG. 2 is a network 270 (e.g., a switched network or bus) coupled between a service processor (not shown), switch 200, subsystems 142, and subsystems 144. The service processor may utilize network 270 to configure and/or initialize switch 200, subsystems 142, and subsystems 144. The service processor may be external to computer system 140 or may be a client included within computer system 140.

As previously described, address/data network 150 is configured to facilitate communication between clients within computer system 140. In the embodiment of FIG. 2, processing subsystems 142 may perform reads or writes which cause transactions to be initiated on address/data network 150. For example, a processing unit within processing subsystem 142A may perform a read to a memory location A that misses in cache 280A. In response to detecting the cache miss, processing subsystem 142A may convey a read request for location A to switch 200 via port 230A. The read request initiates a read transaction. In this example, location A may correspond to a memory location within storage 225A of memory subsystem 144A. Switch 200 may be configured to identify subsystem 144A as a home subsystem of location A and may convey a corresponding request to memory subsystem 144A via port 230B.

Figure 3:
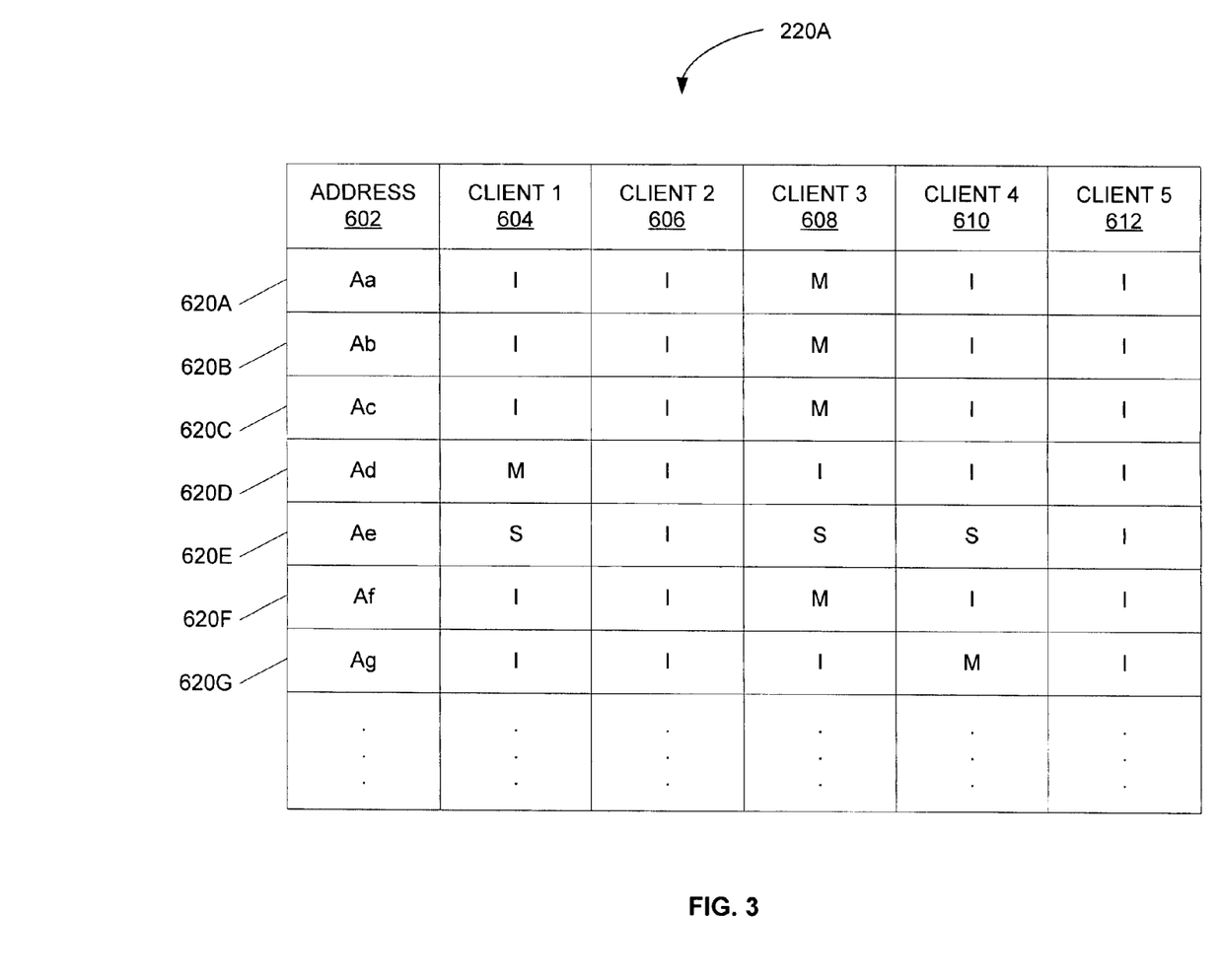
FIG. 3 illustrates one embodiment of a directory.

As stated previously, for coherence requests that are conveyed point-to-point by switch 200, a directory based coherence protocol is implemented. As shown in FIG. 2, each memory subsystem 144 includes a directory 220 that is used to implement a directory protocol. In one embodiment, a MESI cache coherency protocol is utilized. However, other protocols, such as MOESI, are contemplated as well. In the MESI protocol, the owned "O" state, which allows for dirty shared copies, is not utilized. FIG. 3 illustrates one example of a directory 220A that may be maintained by a controller 210A within a memory subsystem 144A. In this embodiment, directory 220A includes an entry 620 for each memory block within storage 225A for which memory subsystem 144A is the home subsystem. In general, a directory may include an entry for each coherency unit for which the memory subsystem is a home subsystem. It is noted that while an embodiment may not utilize a protocol with the "O" state, the description herein may still refer to a subsystem as owning a particular coherency unit if it maintains an exclusive or modified copy.

As used herein, a "coherency unit" is a number of contiguous bytes of memory that are treated as a unit for coherency purposes. For example, if one byte within the coherency unit is updated, the entire coherency unit is considered to be updated. In some embodiments, the coherency unit may be a cache line or a cache block. Thus, in one embodiment, directory 220A maintains an entry 620 for each cache line whose home is memory subsystem 144A. In addition, directory 220A may include an entry for each client 604-612 within computer system 140 that may have a copy of the corresponding cache line. Each entry in directory 220A indicates the coherency state of the corresponding cache line in each client in the computer system. In one embodiment, an address space of the system may be allocated among memory subsystems 144 in a cache line interleaved manner. In such an embodiment, a given memory subsystems 144 is not allocated blocks of contiguous cache lines. Rather, in a system which includes N memory subsystems, each memory subsystems may be allocated every Nth cache line of the address space. Other methods of allocating storage among memory subsystems are possible and are contemplated.

It is noted that numerous alternative directory formats to support directory based coherency protocols may be implemented. For example, while the above description includes an entry 604-612 for each client within a computer system, an alternative embodiment may only include entries for groups of clients. For example, clients within a computer system may be grouped together or categorized according to various criteria. For example, certain clients may be grouped into one category for a particular purpose while others are grouped into another category. In such an embodiment, rather than including an indication for every client in a group, a directory within a memory subsystem 144 may include an indication as to whether any of the clients in a group have a copy of a particular coherency unit. If a request is received for a coherency unit at a memory subsystem 144 and the directory indicates that a group "B" may have a copy of the coherency unit, a corresponding coherency transaction may be conveyed to all clients within group "B." By maintaining entries corresponding to groups of clients, directories 220 may be made smaller than if an entry were maintained for every client in a computer system.

Other directory formats may vary the information stored in a particular entry depending on the current number of sharers. For example, in some embodiments, a directory entry may include a pointer to a client device if there is a single sharer. If there are multiple sharers, the directory entry may be modified to include a bit mask indicating which clients are sharers. Thus, in one embodiment, a given directory entry may store either a bit mask or a pointer depending on the number of sharers.

By maintaining a directory as described above, appropriate coherency actions may be performed by a particular memory subsystem (e.g., invalidating shared copies, requesting transfer of modified copies, etc.) according to the information maintained by the directory. A controller 210 within a subsystem 144 is generally configured to perform actions necessary for maintaining coherency within a computer system according to a specific directory based coherence protocol. For example, upon receiving a request for a particular coherency unit at a memory subsystem 144, a controller 210 may determine from directory 220 that a particular client may have a copy of the requested data. The controller 210 may then convey a message to that particular client which indicates the coherency unit has been requested. The client may then respond with data (e.g., if the coherency unit is modified) or with an acknowledgment or any other message that is appropriate to the implemented coherency protocol. In general, memory subsystems 144 maintain a directory and controller suitable for implementing a directory-based coherency protocol. As used herein, a directory based cache coherence protocol is any coherence protocol that maintains a directory containing information regarding cached copies of data, and in which coherence commands for servicing a particular coherence request are dependent upon the information contained in the directory.

Figure 4:
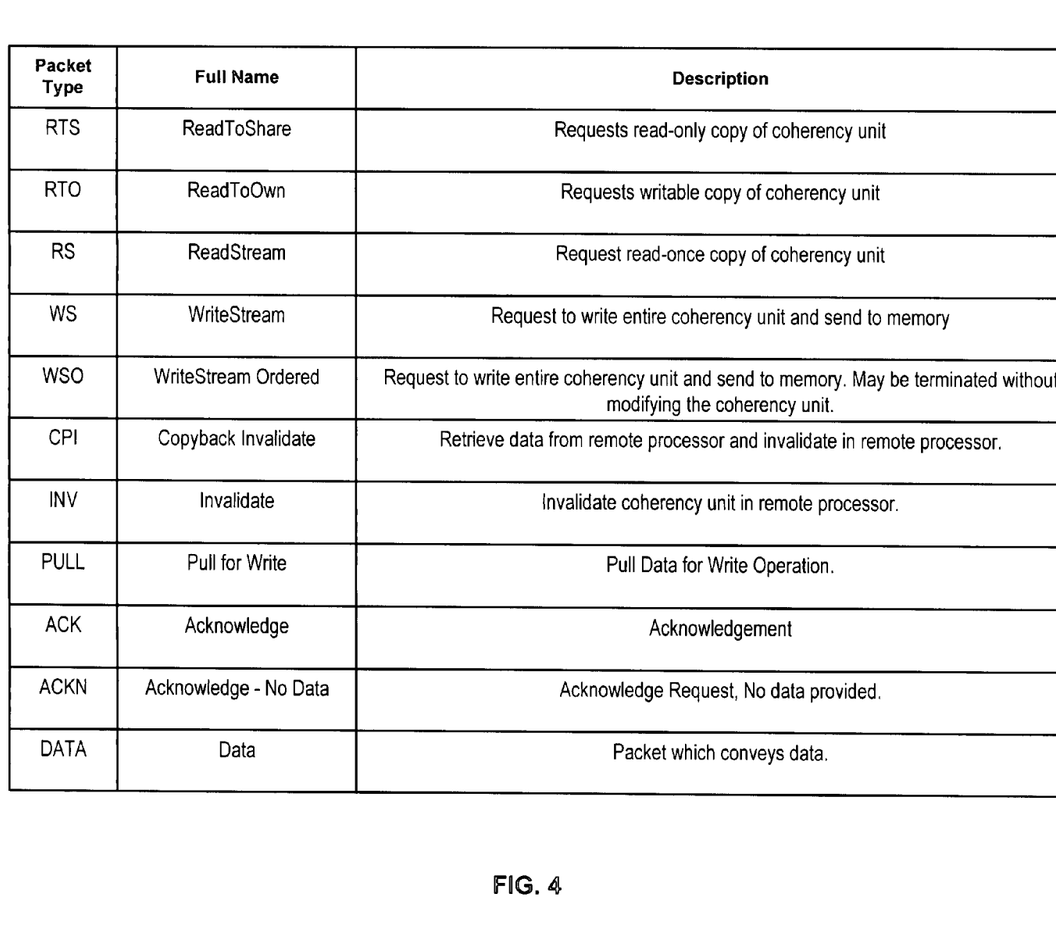
FIG. 4 includes a chart showing various types of packets.

In one embodiment, transactions may be initiated upon address/data network 150 by sending encoded packets that include a specified address. Data packets conveyed on address/data network 150 may be associated with corresponding address transactions using transaction IDs, as discussed below. FIG. 4 is a chart illustrating various packet types, including a description of each, that may be supported by one embodiment of computer system 140. It is to be understood that different and/or additional packet types and/or coherence requests may be supported. As illustrated, coherence requests that may be supported include read-to-share (RTS), read-to-own (RTO), read-stream (RS), writestream (WS), and writestream ordered (WSO), copyback invalidate (CPI), invalidate (INV), pull for write (PULL), acknowledge (ACK), acknowledge with no data returned (ACKN), and a data packet (DATA).

Generally speaking, a read-to-share request may be used by active devices to request read-only copies of coherency units. Similarly, read-to-own requests may be initiated by active devices to request writeable copies of coherency units. A read-stream request initiates a transaction to provide a requesting device with a read-once copy of a coherency unit. A writestream request initiates a transaction to allow a requesting device to write an entire coherency unit and send the coherency unit to memory. A writestream ordered request is a speculative request which initiates a transaction intended to allow a requesting device to write an entire coherency unit and send the coherency unit to memory. However, in contrast to the writestream transaction, the writestream ordered transaction allows the requestor to terminate the transaction without modifying the coherency unit. In addition, the write data in a writestream or a writestream ordered transaction is not allocated in the requester's cache. The copyback invalidate request is used to retrieve data from a processor and invalidate the retrieved data in the processor. The invalidate request is used to invalidate a coherency unit in a processor. The pull request is used to retrieve data from a processor for a write operation. The acknowledge packet type is used for acknowledging various requests. The acknowledge—no data is used to acknowledge a request for data, but indicates no data will be provided. Finally, the data packet is used to convey data. As already noted, other and/or different packet types may be utilized in addition to those described above. Further, subsets of the above packet types may be used as well. For example, different types of DATA packets may be used for conveying cacheable data, non-cacheable data, read stream data, and so on. Each such data packet may have a distinguishable identifier to indicate its type. Similarly, different types of acknowledgments or pull requests may be utilized. Numerous such alternatives are possible and are contemplated.

Figure 5:
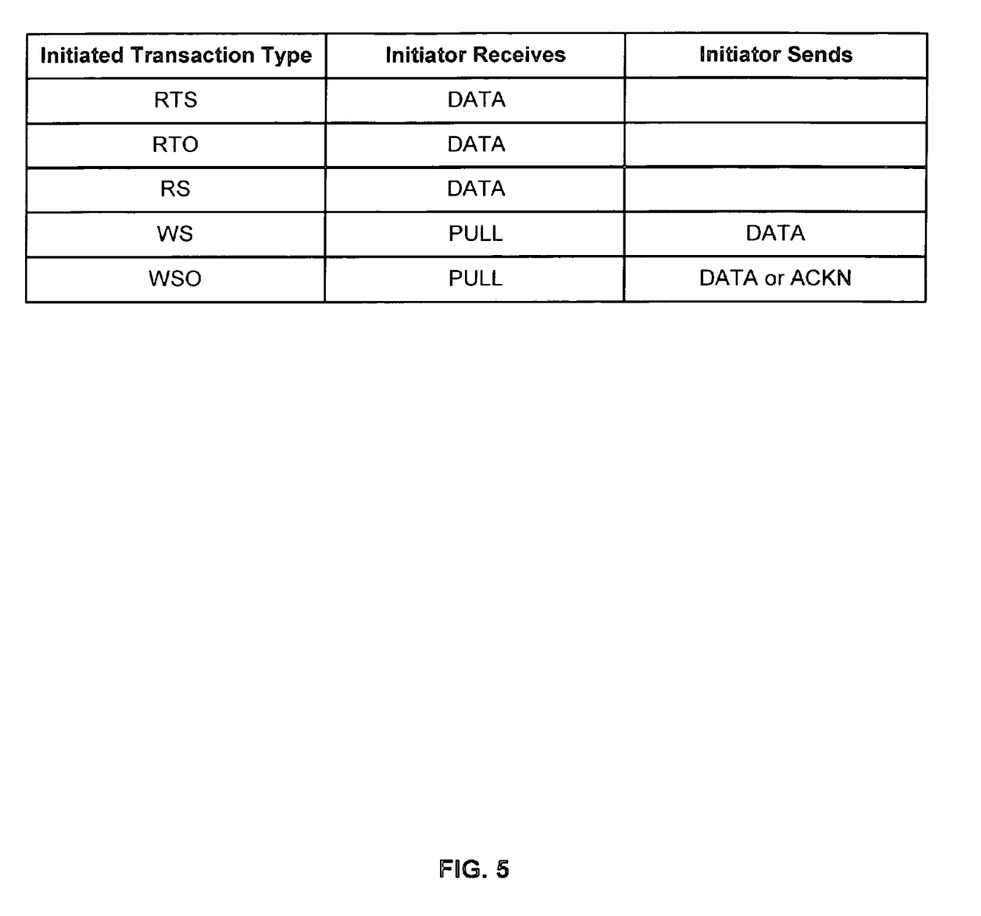
FIG. 5 depicts various types of transactions and packet types.

In one embodiment, cacheable transactions may result in at least one packet being received by the initiating client on the address/data network 150. Some transactions may require that a packet, in addition to the original transaction request packet, be sent from the initiating client on the address/data network 150 (e.g., a write-back transaction). FIG. 5 shows a chart which highlights one embodiment of certain activities associated with the above packet types and corresponding requests. The first column in FIG. 5 identifies a particular transaction type initiated by an initiator. The second column identifies packet types which may be received by the initiator as part of the initiated transaction. Finally, the third column identifies further packets which may be conveyed by the initiator as part of the transaction. As seen in the example of FIG. 5, the RTS, RTO, and RS transactions may generally result in the initiator receiving requested DATA. In the case of a WS transaction, the initiator may generally receive a PULL, and may further send DATA. Finally, in the case of a WSO transaction, the initiator may generally receive a PULL for the write data, and may either send the DATA or an ACKN without data.

When an initiator initiates a transaction, the address packet for that transaction may include a transaction ID. In one embodiment, the transaction ID may be formed by the initiator's device ID and a packet ID assigned by the initiator. The DATA, and/or PULL packets that the initiator receives may be routed to the initiator through address/data network 150 by placing the initiator's device ID in the packets' routing prefixes. In addition, the DATA, ACK and/or PULL packets may contain a destination packet ID field which matches the packet ID assigned by the initiator, allowing the initiator to match the DATA, ACK, and/or PULL packet to the correct transaction. Furthermore, PULL packets may include a pull ID consisting of the source's device ID and a packet ID assigned by the source (that is, the client which sent the PULL packet). After receiving a PULL packet, the initiator may send a DATA or ACKN packet to the source of the PULL. This DATA or ACKN packet may be routed by placing the device ID of the source of the PULL in the packet's routing prefix. The DATA or ACKN packet may contain a destination packet ID field that allows it to be matched with the correct PULL (in addition, the packet may include a flag which indicates that it was sent in response to a PULL, thus preventing confusion between transaction IDs and pull IDs).

As mentioned above, some embodiments may include a transaction that allows a processor to write an entire coherency unit and send it to memory without receiving the previous contents of the coherency unit. For example, the above described writestream request allows a processor to write an entire coherency unit and send it to memory without receiving the previous contents of the coherency unit. Because the previous contents of the cache line are discarded, the processor must commit to carrying through with the transaction and writing the entire coherency unit. However, in certain situations, the possibility of deadlock situations may arise where multiple processors are contending for the same resources as discussed below.

Figure 6:
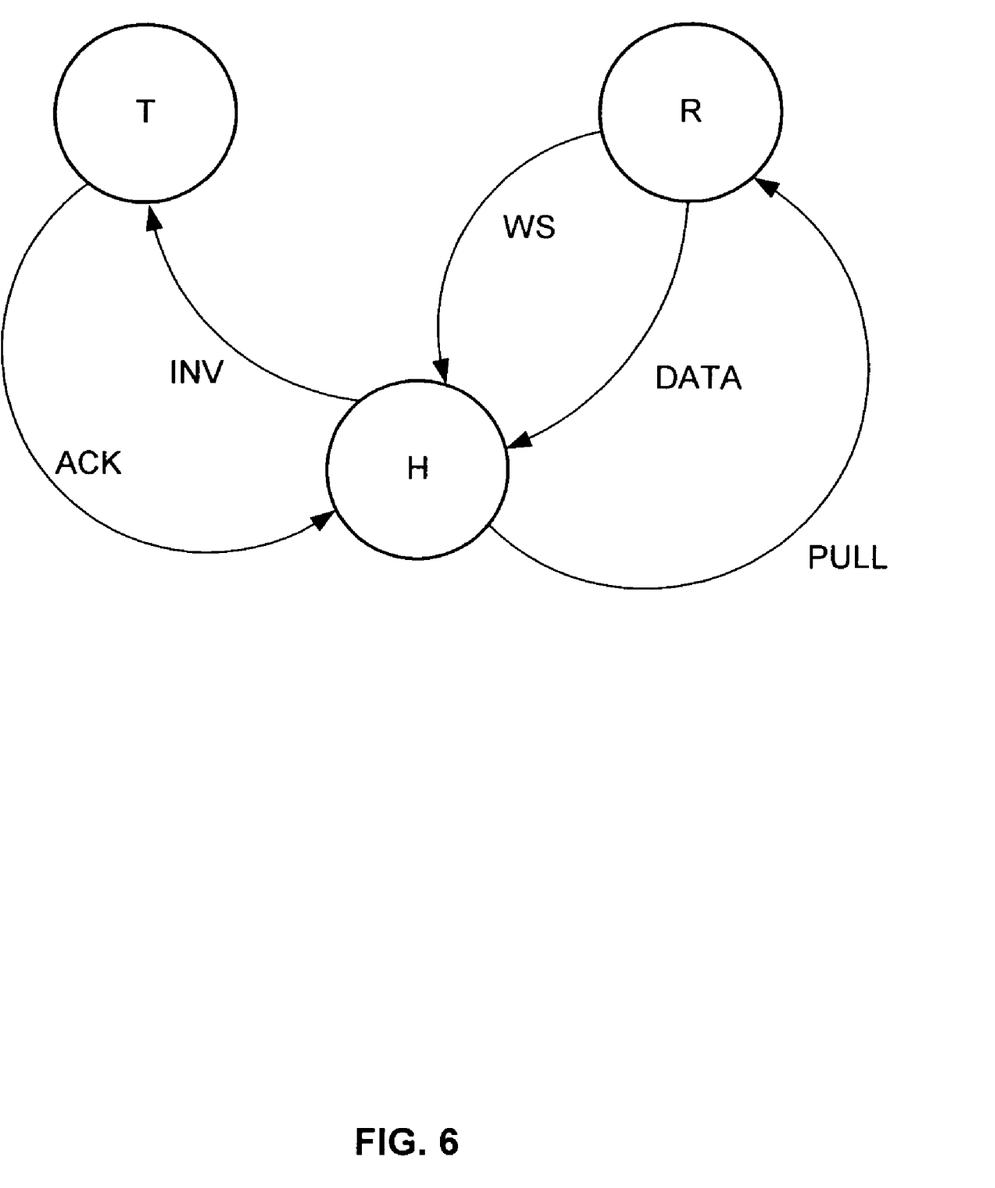
FIG. 6 depicts a scenario involving a writestream transaction.

In one embodiment, writestream (WS) transactions initiated by a processor are ordered with respect to one another within the processor. Therefore, if a processor initiates a writestream transaction to a cache line "A", followed by a writestream transaction to a cache line "B", the writestream to "A" must be completed by the processor before the writestream to "B" is completed. FIG. 6 depicts one embodiment of a writestream transaction in which no deadlock occurs. In this example, a requesting device R has invalid access to a particular coherency unit. Target T has write access permission to the coherency unit (e.g., T has a modified "M" copy of the coherency unit). R initiates a WS transaction by sending a WS request to the home memory subsystem H of the coherency unit. The home memory subsystem H determines that T has a modified copy of the unit and conveys an INV to T. T then invalidates its copy of the coherency unit and conveys an ACK to the home subsystem. In response to receiving the ACK from T, the home subsystem conveys a PULL to R in order to retrieve the write data. R then conveys the write data to the home subsystem which stores the data in memory.

Figure 7A:
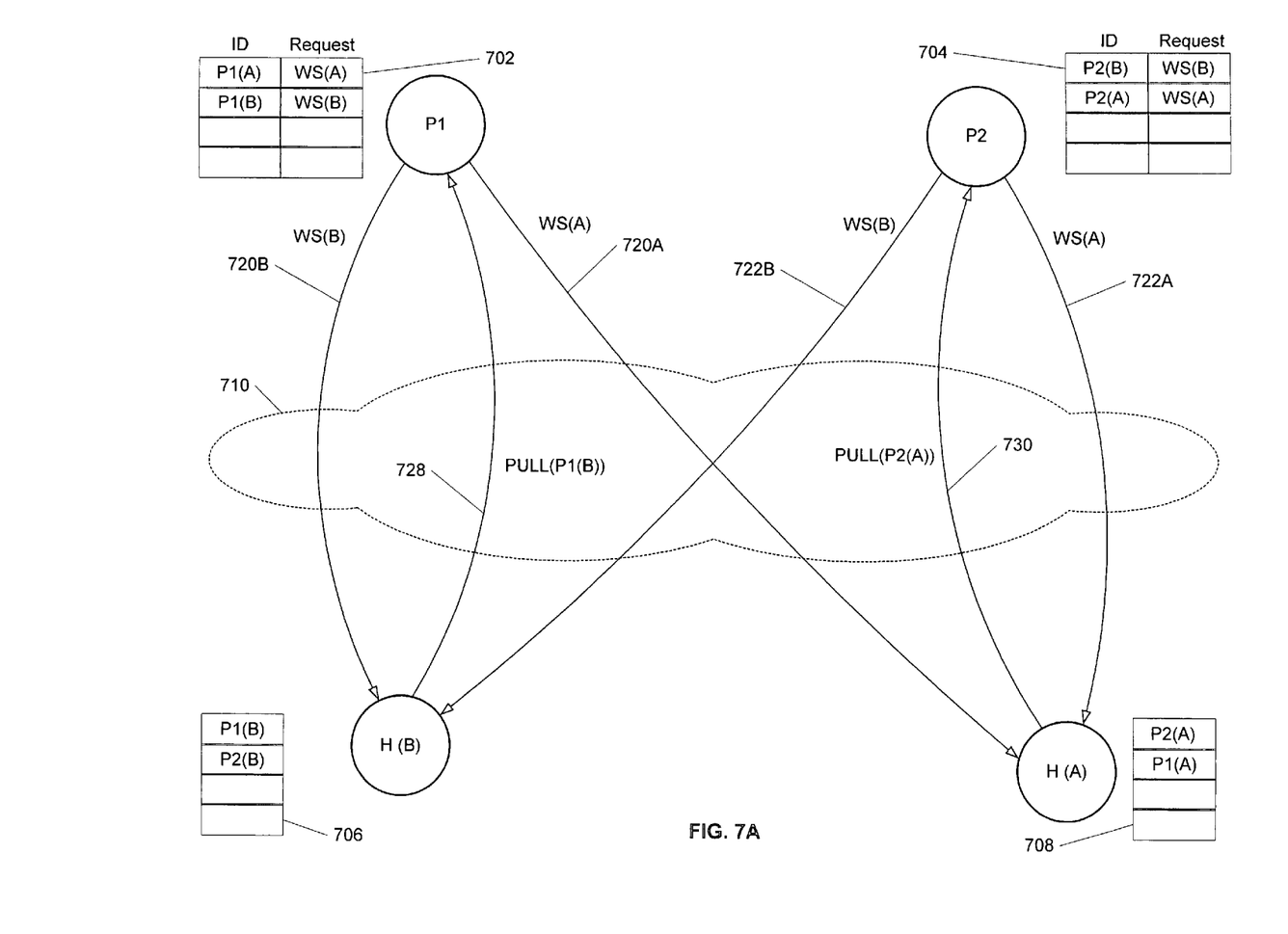
FIG. 7A illustrates a deadlock scenario involving writestream transactions.

Turning now to FIG. 7A, a scenario is depicted in which a deadlock occurs. FIG. 7A shows a first processor P1, a second processor P2, a home memory subsystem H(B) of a memory block B, and a home memory subsystem H(A) of a memory block A. For purposes of discussion, queues 702 and 704 are illustrated which are used to represent requests conveyed by processors P1 and P2, respectively. As shown, each queue 702-704 includes a separate row for each entry. Included in each row is a column which stores an identifier (ID) which is used to uniquely identify the request, and a column (Request) which identifies the corresponding request. In the example shown, higher entries in the queue represent older requests. Therefore, in queue 702, the request identified as P1(A) precedes the request identified as P1(B). Also depicted are queues 706 and 708 at each of the home memory subsystems which serve to illustrate the order in which requests are received. Higher rows of queues 706 and 708 store older requests than lower rows. In addition to the above, a network interconnect 710 is depicted.

We now turn to a description of the scenario depicted by FIG. 7A. In the example shown, each of processors P1 and P2 initiate a sequence of writestream requests to a coherency unit "A" and a coherency unit "B". As noted above, the home memory subsystem for coherency unit "A" is memory subsystem H(A), and the home memory subsystem for coherency unit "B" is the memory subsystem H(B). In one embodiment, the coherency unit is a cache line. Processor P1 initiates a WS 720A to cache line A, followed by a writestream 720B to cache line B. Processor P2 initiates a writestream 722B to cache line B, followed by a writestream 722A to cache line A. Home memory subsystem H(B) receives the writestream to B from P1 prior to receiving the writestream to B from P2. Home memory subsystem H(A) receives the writestream to A from P2 prior to receiving the writestream to A from P1. In the embodiment shown, a given home memory subsystem processes requests for a given cache line in the order received. Further, when a home memory subsystem begins processing a received request for a particular cache line, no further requests directed to that cache line may be processed by the home memory subsystem until the prior request for the cache line is completed. In addition, processors P1 and P2 must complete writestream transactions initiated by the processor in the order in which they are initiated. Therefore, processor P1 must complete request P1(A) prior to P1(B), and processor P2 must complete P2(B) prior to P2(A). Still further, in one embodiment, when a processor initiates a writestream transaction to a particular cache line, that processor locks the particular cache line and prevents further accesses to the cache line until the writestream transaction is completed.

Because home memory subsystem H(B) receives P1(B) prior to P2(B), home memory subsystem H(B) processes P1(B) first and conveys a PULL request 728 to processor P1 requesting the corresponding write data. Similarly, home memory subsystem H(A) processes request P2(A) first and conveys a PULL request 730 to processor P2. Processor P1 has now received a PULL request 728 for request P1(B). However, processor P1 cannot processes request P1(B) until request P1(A) is completed. Similarly, processor P2 has received a PULL request 730 for request P2(A). However, processor P2 cannot processes request P2(A) until request P2(B) is completed. At this point, because the writestream transaction requires a processor to commit to completion of the writestream transaction once initiated, neither processor P1 nor P2 can proceed, progress cannot be made, and a deadlock has occurred.

Figure 7B:
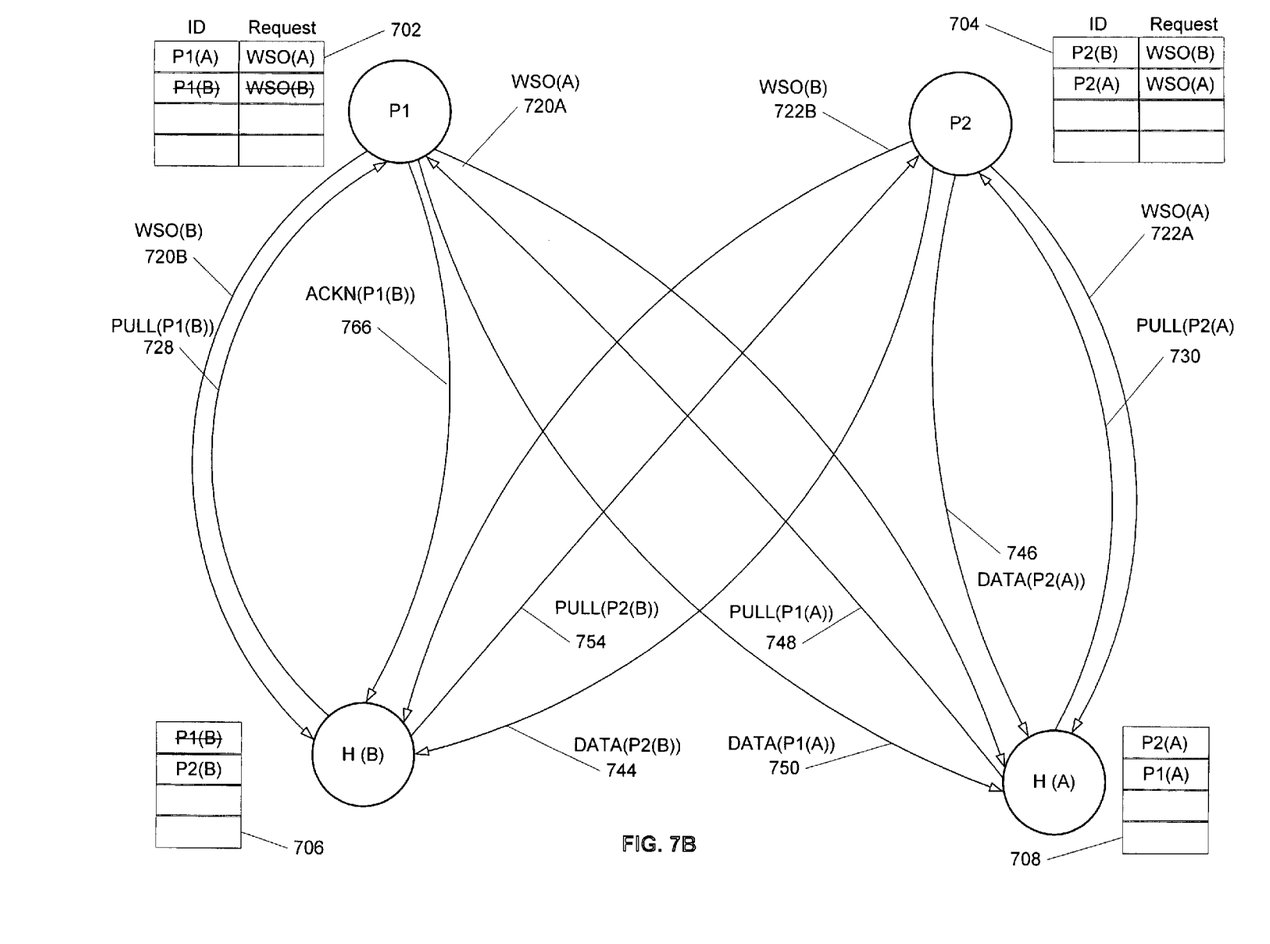
FIG. 7B depicts a scenario involving writestream ordered transactions.

In order to prevent such deadlocks, an alternative method and mechanism as illustrated by FIG. 7B may be utilized. In the embodiment of FIG. 7B, a writestream ordered (WSO) transaction is used. However, in contrast to the writestream (WS) transaction described in FIG. 7A, the WSO transaction and protocol depicted in FIG. 7B avoids the above deadlock situation. Elements in FIG. 7B generally correspond to those of FIG. 7A and are similarly numbered. In one embodiment, the WSO transaction and protocol in FIG. 7B may replace the WS transaction of FIG. 7A. Alternatively, the WSO transaction of FIG. 7B may be in addition to the WS transaction and may have an encoding which distinguishes the two.

Much like the WS transaction, a requester may use the WSO transaction to write an entire coherency unit (e.g., cache line) and send the result to memory. The cache line is not placed in the requester's cache. The WSO transaction differs from the WS transaction in at least one respect in that the WSO transaction allows the requester to terminate the transaction without modifying the cache line. The ability to terminate the transaction without performing a write may be useful when multiple writestream ordered transactions are outstanding simultaneously and the responses from the directory arrive in an order that is inconsistent with the order in which the writes must be performed (as shown in FIG. 7A). In one embodiment, the WSO transaction does not provide read access to the cache line, nor does it allow the cache line to be placed in a cache. The WSO transaction may make efficient use of bandwidth in that the previous contents of the cache line need not be provided to the requester. In one embodiment, the WSO transaction may be used for strongly ordered full-cache line DMA write operations. Generally speaking, in one embodiment, operation of the WSO transaction may be as follows:

The requester first sends a WSO packet with a request ID (e.g., ID=X) for a particular address to the directory.

If the requested address is legal, the directory owns the cache line, and there are no shared copies of the cache line in other processors, the directory sends a pull packet with response ID=X and pull ID=Z to the requester. The requester then responds with a DATA or ACKN packet with response ID=Z.

If the requested address is legal and the cache line may be shared or owned by another processor, the directory sends:

(1) an invalidate packet with request ID=Y to each potential sharer, each of which responds with an ACKI packet with response ID=Y; and (2) a CPI packet to the potential owner, if any, which responds with a DATA packet if it had the cacheline in state M, or with an ACKI packet otherwise.

(3) The directory then sends a pull packet with response ID=X and pull ID=Z to the requester. The requester then responds with a DATA or ACKN packet with response ID=Z.

If the request is for an illegal address, the directory responds with an error packet with response ID=X.

Similar to FIG. 7A, FIG. 7B shows that processor P1 has initiated a WSO request 720A to A followed by a WSO request 720B to B. Also, processor P2 has initiated a WSO 722B to B, followed by a WSO 722A to A. Home memory subsystem H(B) receives and processes the request P1(B) first, and home memory subsystem H(A) receives and processes the request P2(A) first. Home subsystem H(A) then conveys a PULL(P2(A)) 730 to processor P2, and home subsystem H(B) conveys a PULL(P1(B)) 728 to processor P1. Consequently, a deadlock situation similar to FIG. 7A would seem to have occurred. However, in the embodiment of FIG. 7B, processors P1 and P2 need not commit to completing the WSO request once initiated. Rather, a processor which initiates a WSO request may terminate the transaction without writing the corresponding data. For example, in one embodiment, when a processor initiates a WSO request for a given coherency unit, the processor locks accesses to the coherency unit as was described above in the discussion of FIG. 7A. However, in this embodiment, a processor may terminate the WSO request after a predetermined period of time (e.g. a timeout period) if a response necessary to complete the request (e.g., a response corresponding to a blocking request) has not been received. If a WSO request times out, the processor may then store an indication that the request has timed out and unlock the corresponding coherency unit. In this manner, processing with respect to the coherency unit may proceed within the processor's subsystem. In addition, when a WSO request times out within a given processor, the processor returns an indication (e.g., ACKN) in response to the PULL request which acknowledges the PULL, but indicates no data will be returned. In response to receiving the ACKN, the home memory subsystem may consider the transaction complete. The timeout period for a writestream ordered transaction may be programmable. For example, in one embodiment, the timeout period may be programmed to equal some multiple of the expected latency for receiving a response to an initiated writestream ordered request. Other methods of determining a timeout period are possible and are contemplated.

Returning to FIG. 7B, processor P1 has received a PULL 728 for P1(B) and processor P2 has received a PULL 730 for P2(A). As each processor has earlier transactions which must be completed before providing data in response to the PULL is possible, each processor may generally continue waiting for completion of the earlier transaction. However, with the WSO transaction, after the expiration of some period of time, either or both of processors P1 and P2 may time out the blocked transaction. In the example shown, processor P1 times out the transaction P1(A). The timeout of transaction P1(A) in processor P1 is indicated by the strikethrough of the corresponding entry in the queue 702. At this point, processor P1 may unlock the cache line A. Processor P1 also returns an ACKN 766 in response to the previously received PULL 728. Upon receipt of the ACKN 766 from processor P1, home memory subsystem H(B) may treat the transaction P1(B) as complete and process the next transaction P2(B) by issuing a PULL(P2(B)) request 754 to processor P2. Processor P2 may then complete the transaction P2(B) by returning DATA 744 to home system H(B), and process transaction P2(A) by returning DATA 746 to home memory subsystem H(A). Home memory subsystem H(A) may then complete transaction P2(A) and process transaction P1(A) by issuing a PULL 748 to processor P1. In response to receiving the PULL 748, processor P1 returns DATA 750 to home memory subsystem H(A). Consequently, the embodiment supports speculative writestream ordered transactions without requiring processors to commit to writing the data. In this manner, deadlocks may be avoided and processors may not be blocked from accessing a locked cache line for an inordinate period of time. In various embodiment, a processor may or may not reinitiate a timed out writestream ordered transaction as appropriate for a given implementation.

Figure 8:
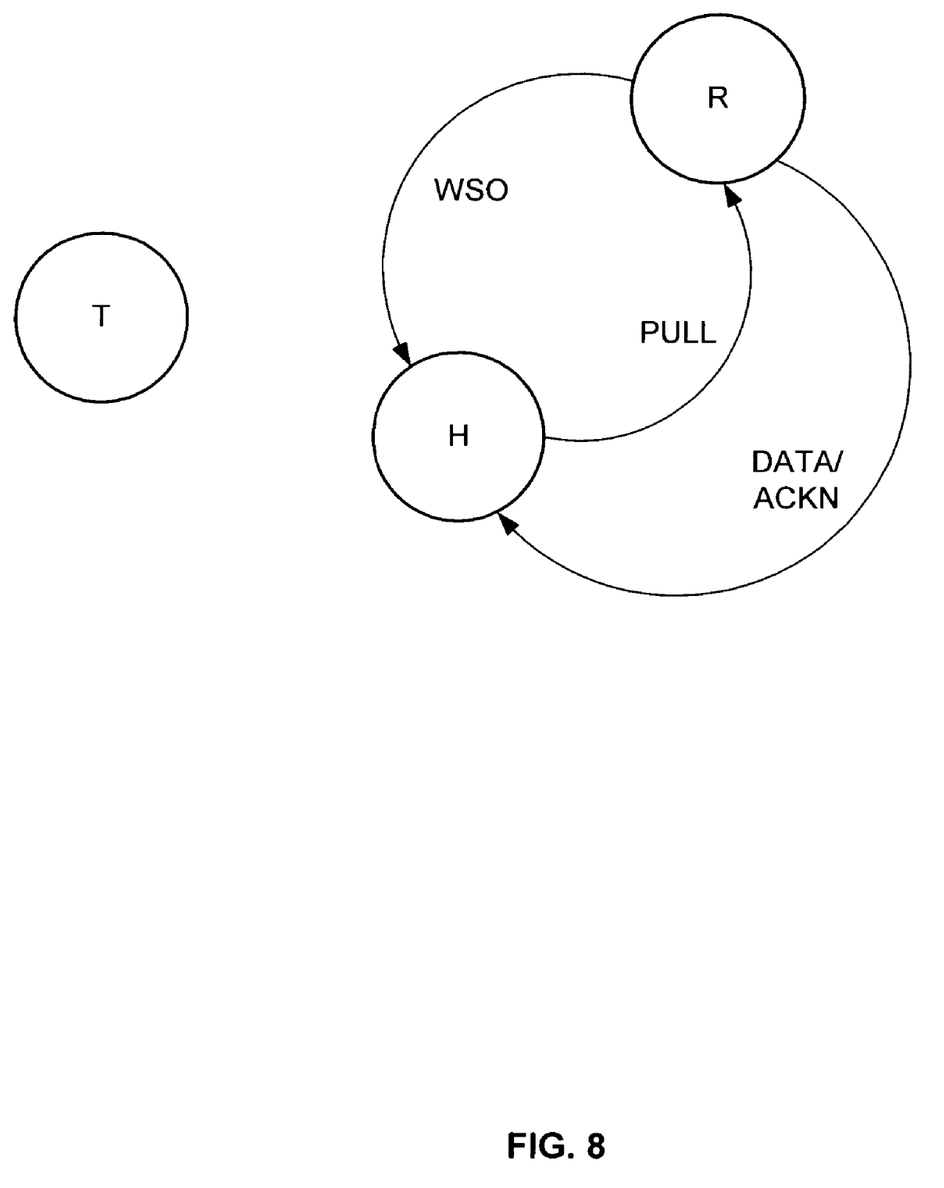
FIG. 8 illustrates a writestream ordered transaction in which the coherency unit is in an invalid state in all processors.

Various other scenarios involving a writestream ordered request are now described. In the following figures, the requesting subsystem (i.e., the subsystem initiating the WSO transaction) is identified as "R", the home memory subsystem of the corresponding coherency unit is identified as "H", and other clients are identified as target "T" subsystems. FIG. 8 illustrates a WSO transaction initiated by a requester wherein the coherency unit being written to is in an invalid state in all processors. In this scenario, the requesting node R conveys the WSO request to home node H which determines that no other nodes are maintaining a valid copy of the coherency unit. Therefore, the home memory subsystem H conveys a PULL request for the data to requester R. In response, the requester either returns the data (DATA) or an ACKN if the request timed out.

Figure 9:
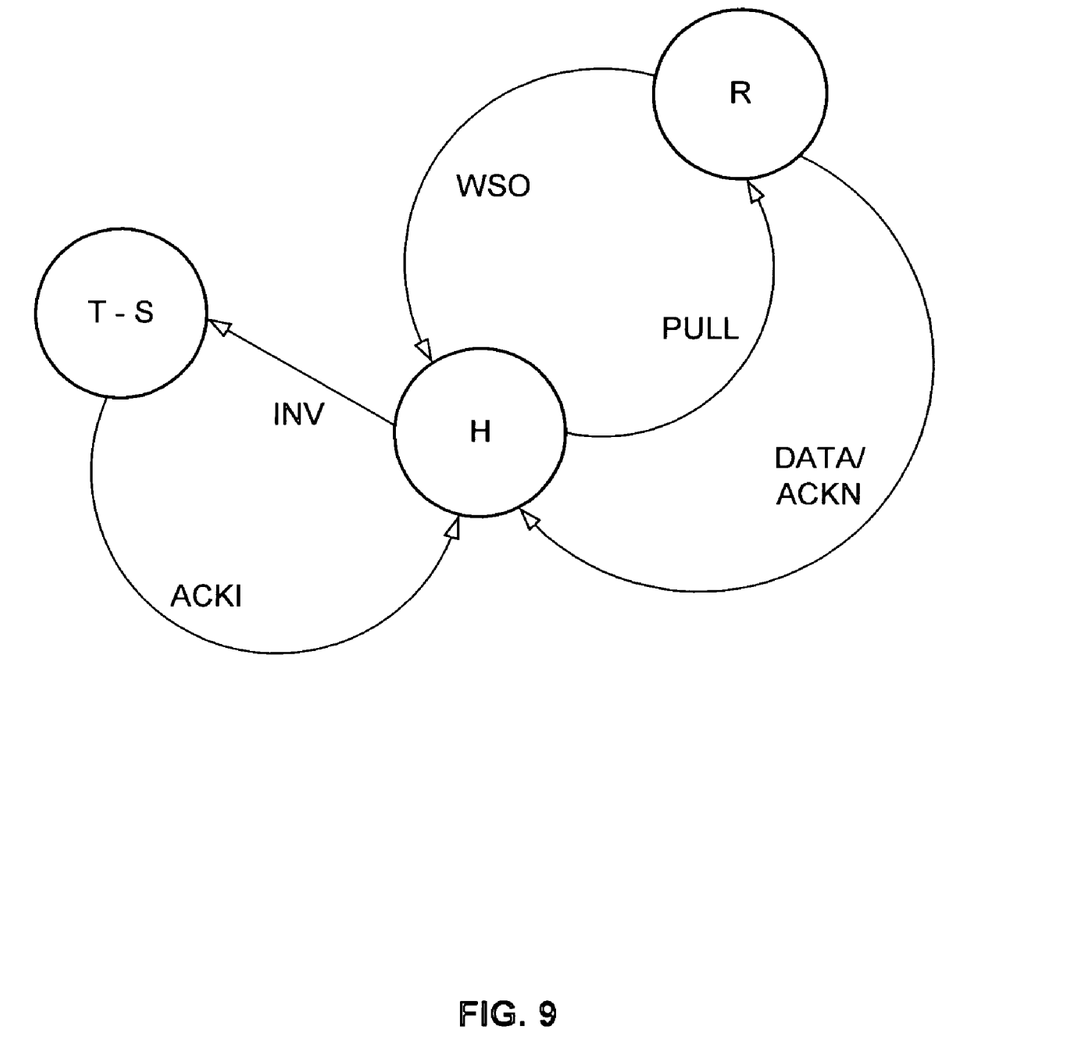
FIG. 9 illustrates a writestream ordered transaction wherein a target processor has a shared copy of the coherency unit.

FIG. 9 illustrates a scenario in which a target T has a shared copy of the coherency unit being addressed by a WSO transaction. In this scenario, the requester conveys the WSO request to the home memory subsystem of the coherency unit. By reference to its directory, the home memory subsystem H determines that T has a shared copy of the coherency unit and conveys an invalidate (INV) command to the target T. The target T responds with an acknowledgment of invalidation (ACKI). The home memory subsystem H then conveys a PULL request to the requester R which then responds with either the DATA or an ACKN.

Figure 10:
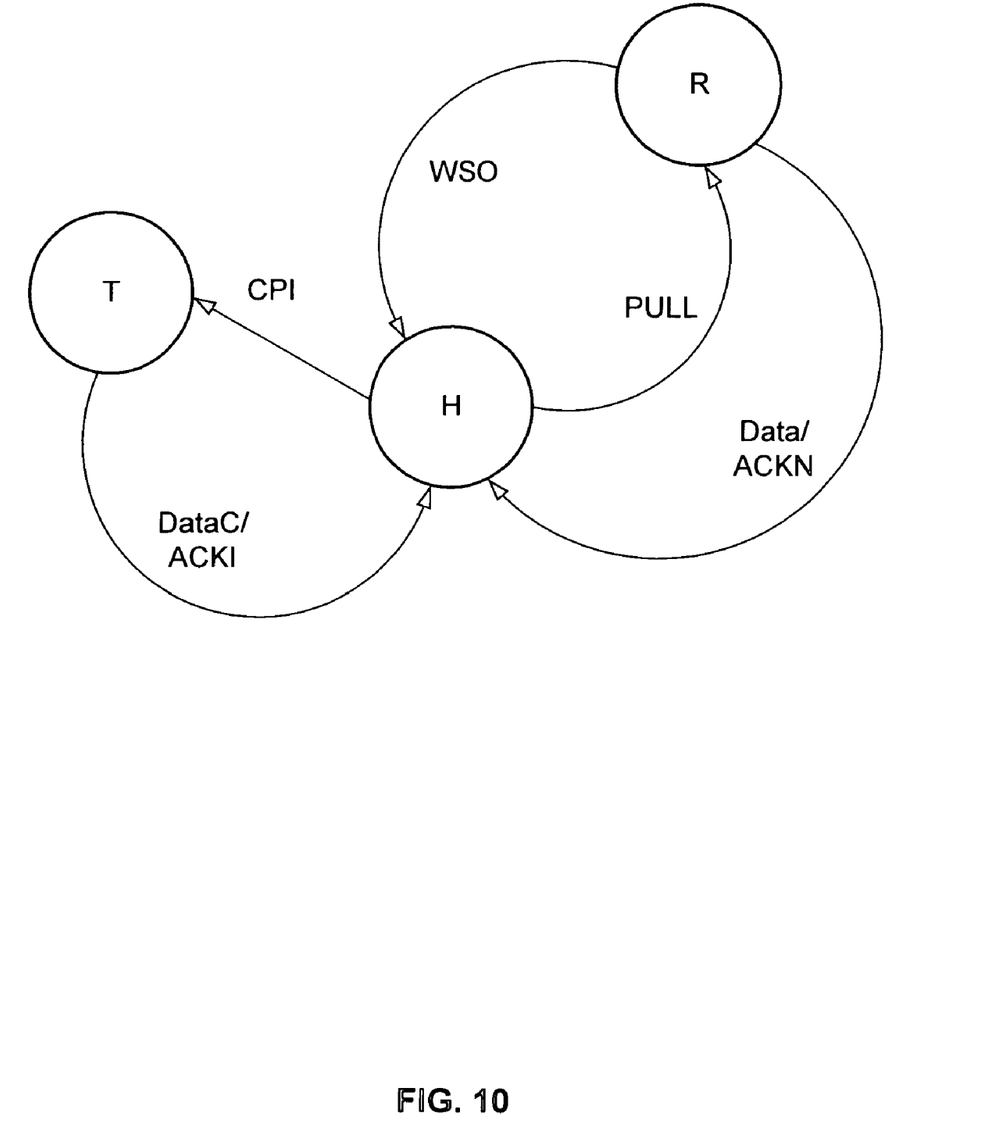
FIG. 10 illustrates a writestream ordered transaction wherein a target processor owns a copy of the coherency unit.

FIG. 10 depicts a scenario in which a target client has a modified or exclusive copy of the coherency unit addressed by a WSO transaction. Subsequent to receiving the WSO request from the requester R, the home memory subsystem determines that T has a modified or exclusive copy of the coherency unit. The home memory subsystem H then conveys a copyback and invalidate (CPI) request to the target T. If the target T has a copy in the M state, it returns the modified copy of the coherency unit (DataC) and invalidates its copy. If, on the other hand, the target T has a copy in the E state, it invalidates its copy and returns an ACKI. The home memory subsystem then conveys a PULL request to the requester R which responds with either the DATA or an ACKN. If the requester R returns DATA, the home memory subsystem may write the DATA to memory and discard the copyback data DataC received from the target T. If the requester responds with ACKN, the home memory subsystem H may store the copy back DataC.

Numerous variations and modifications will become apparent to those skilled in the art once the above disclosure is fully appreciated. It is intended that the following claims be interpreted to embrace all such variations and modifications.

What is claimed is:

1. A computer system, comprising:
   a first processing subsystem configured to:
      initiate a first writestream ordered (WSO) transaction by conveying a first WSO request; and
      initiate a second WSO transaction by conveying a second WSO request, wherein the second WSO transaction is initiated after the first WSO transaction;
   a first memory subsystem configured to convey a pull request to the first processing subsystem for write data corresponding to the second WSO request, in response to receiving the second WSO request;
   wherein in response to receiving the pull request, the first processing subsystem is configured to:
      convey the write data to the first memory subsystem, in response to determining there are no uncompleted WSO transactions which were initiated prior to the second WSO transaction in the first processing subsystem; and
      cancel the second WSO transaction, in response to detecting (i) the first WSO transaction is not complete and (ii) the expiration of a predetermined period of time;
      wherein in response to canceling the second WSO transaction, the first processing subsystem is further configured to convey an acknowledgment without said write data to the first memory subsystem.

2. The computer system as recited in claim 1, wherein WSO transactions in the system are configured to update an entire coherency unit, and wherein the first processing subsystem is configured to complete WSO transactions initiated by the first processing subsystem in the order in which they are initiated.

3. The computer system as recited in claim 2, wherein the first processing subsystem is configured to perform WSO transaction writes to coherency units without first receiving a copy of a coherency unit which is being written.

4. The computer system as recited in claim 3, wherein the first memory subsystem is configured to process requests corresponding to a given coherency unit in the order in which they are received.

5. The computer system as recited in claim 4, wherein in response to receiving the second WSO request, the first memory subsystem is configured to:
   determine a state of said second coherency unit in subsystems within the computer system;
   convey an invalidation command to target processing subsystems which have a shared copy of the second coherency unit; and
   convey invalidate commands to target processing subsystems which own a copy of the second coherency unit.

6. The computer system as recited in claim 5, further comprising a second processing subsystem configured to initiate WSO transactions and a second memory subsystem which is a home memory of said first coherency unit, wherein each of the first and second processing subsystems are coupled to the each of the first and second memory subsystems via point-to-point links.

7. The computer system as recited in claim 3, wherein the first WSO transaction is configured to perform a write to a first coherency unit, and the second WSO transaction is configured to perform a write to a second coherency unit, and wherein when the first processing subsystem initiates a given WSO transaction corresponding to a particular coherency unit, the first processing subsystem is configured to lock the particular coherency unit until the given WSO transaction is either completed or cancelled.

8. A method comprising:
   initiating in a first processing subsystem a first writestream ordered (WSO) transaction by conveying a first WSO request, and a second WSO transaction by conveying a second WSO request, wherein the second WSO transaction is initiated after the first WSO transaction;
   conveying a pull request from a first memory subsystem to the first processing subsystem for write data corresponding to the second WSO request, in response to receiving the second WSO request;
   receiving the pull request in the first processing subsystem;
   conveying the write data to the first memory subsystem, in response to determining there are no uncompleted WSO transactions which were initiated prior to the second WSO transaction in the first processing subsystem;
   canceling the second WSO transaction, in response to detecting (i) the first WSO transaction is not complete, and (ii) the expiration of a predetermined period of time; and
   wherein in response to canceling the second WSO transaction, the first processing subsystem conveys an acknowledgment without said write data to the first memory subsystem.

9. The method as recited in claim 8, wherein the first processing subsystem is configured to complete WSO transactions initiated by the first processing subsystem in the order in which they are initiated.

10. The method as recited in claim 9, wherein the first processing subsystem is configured to perform WSO transaction writes to coherency units without first receiving a copy of a coherency unit which is being written.

11. The method as recited in claim 10, further comprising the first memory subsystem processing requests corresponding to a given coherency unit in the order in which they are received.

12. The method as recited in claim 11, wherein in response to receiving the second WSO request, the method further comprises the first memory subsystem:
- determining a state of said second coherency unit in subsystems within the computer system;
- conveying an invalidation command to target processing subsystems which have a shared copy of the second coherency unit; and
- conveying invalidate commands to target processing subsystems which own a copy of the second coherency unit.

13. The method as recited in claim 12, further comprising a second processing subsystem configured to initiate WSO transactions and a second memory subsystem which is a home memory of said first coherency unit, wherein each of the first and second processing subsystems are coupled to the each of the first and second memory subsystems via point-to-point links.

14. The method as recited in claim 10, wherein the first WSO transaction is configured to perform a write to a first coherency unit, and the second WSO transaction is configured to perform a write to a second coherency unit, and wherein when the first processing subsystem initiates a given WSO transaction corresponding to a particular coherency unit, the method further comprises the first processing subsystem locking the particular coherency unit until the given WSO transaction is either completed or cancelled.

15. A processing subsystem comprising:
- a processing unit; and
- a cache controller;
- wherein the processing unit is configured to:
  - initiate a first writestream ordered (WSO) transaction by conveying a first WSO request;
  - initiate a second WSO transaction by conveying a second WSO request, wherein the second WSO transaction is initiated after the first WSO transaction;
  - receive a pull request for write data corresponding to the second WSO request;
  - convey the write data, in response to determining there are no uncompleted WSO transactions which were initiated prior to the second WSO transaction in the first processing subsystem;
  - cancel the second WSO transaction, in response to detecting (i) the first WSO transaction is not complete and (ii) the expiration of a predetermined period of time; and
  - convey an acknowledgment without data in response to the pull request, in response to canceling the second WSO transaction.

16. The processing subsystem as recited in claim 15, wherein WSO transactions are configured to update an entire coherency unit, and wherein the processing subsystem is configured to complete WSO transactions initiated by the processing subsystem in the order in which they are initiated.

17. The processing subsystem as recited in claim 16, wherein the processing unit is configured to perform WSO transaction writes to coherency units without first receiving a copy of a coherency unit which is being written.

* * * * *